June 22, 1965   N. M. REED   3,190,670
SNOW VEHICLE
Filed Dec. 4, 1963

INVENTOR.
NORMAN M. REED,
BY *Jungblut, Melville,*
*Strauser & Foster*

ATTORNEYS.

United States Patent Office 3,190,670
Patented June 22, 1965

3,190,670
SNOW VEHICLE
Norman M. Reed, Walton, Ky., assignor to Development Consultants, Inc., Cincinnati, Ohio, a corporation of Ohio
Filed Dec. 4, 1963, Ser. No. 327,983
6 Claims. (Cl. 280—18)

Snow vehicles for use by one or more individuals have taken various forms. The conventional sled comprises a platform for the rider, which platform is held a substantial distance from the snow by one or more depending runners. Such vehicles, where the runners are narrow, are most effective when used on a snow or ice covering through which the runners will not cut. The runners tend to cause the vehicle, under the influence of gravity to move in a single direction, so much so that steering has been accomplished in some types of sleds by bending the runners transversely. As contrasted with conventional sled, there is the equally conventional toboggan which has a thin wooden bottom bent up and over at one end and forming the load platform. A toboggan, by reason of its broad bearing surface underneath has a certain advantage because it may be used with light or fluffy snow coverings through which the runners of the conventional sled would cut. Some interest has been shown in the sport of sliding down snow-covered slopes in pan shaped structures; but here, the movements of the vehicle are likely to be erratic, and there is no easy way of causing the vehicle to follow a pre-determined course.

It has hitherto been suggested that snow vehicles for personal use could be made of elongated form, and having bottom surfaces providing a broad bearing surface. But these are also difficult to manage, and the provision of shallow ribs on the underside of the structure is either ineffective or else presents the same sort of difficulties inherent in the runners of the conventional sled.

It is an object of the invention to provide a vehicle for personal use which combines the advantages of a broad bottom with stabilizing means as hereinafter set forth.

It is an object of the invention to provide a snow-vehicle having the indicated advantages, but which is light and inexpensive to manufacture, and which does not require the preformation of permanent bends in wooden members.

The term "snow vehicle" as used herein is intended to be indicative of a basic field of utility of the invention, but not limiting inasmuch as principles of the invention may be applied to vehicles designed for use on the surface of the water when towed.

The above objects and others which will be set forth hereinafter or will be apparent to one skilled in the art upon reading these specifications, are accomplished by that construction and arrangement of parts of which an exemplary embodiment will now be described. Reference is made to the drawings wherein.

Figure 1:
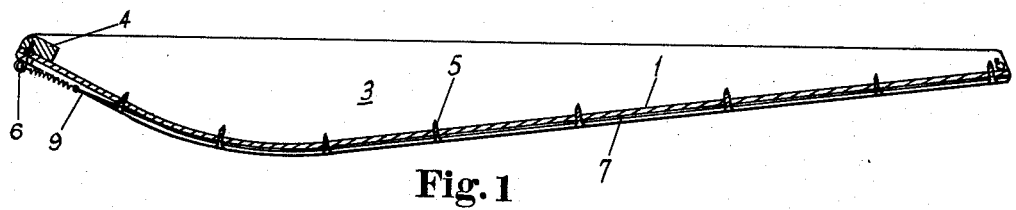
FIGURE 1 is a longitudinal sectional view of the structure of the invention.
Figure 2:
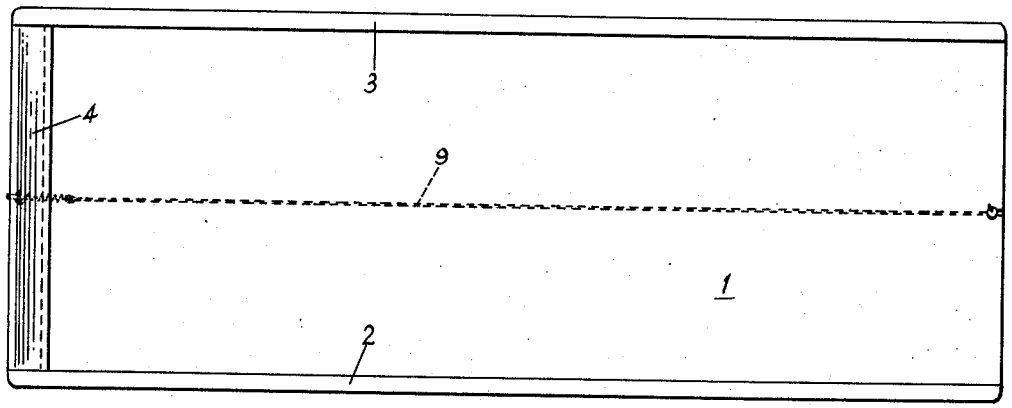
FIGURE 2 is a top plan view of the same structure.
Figure 3:
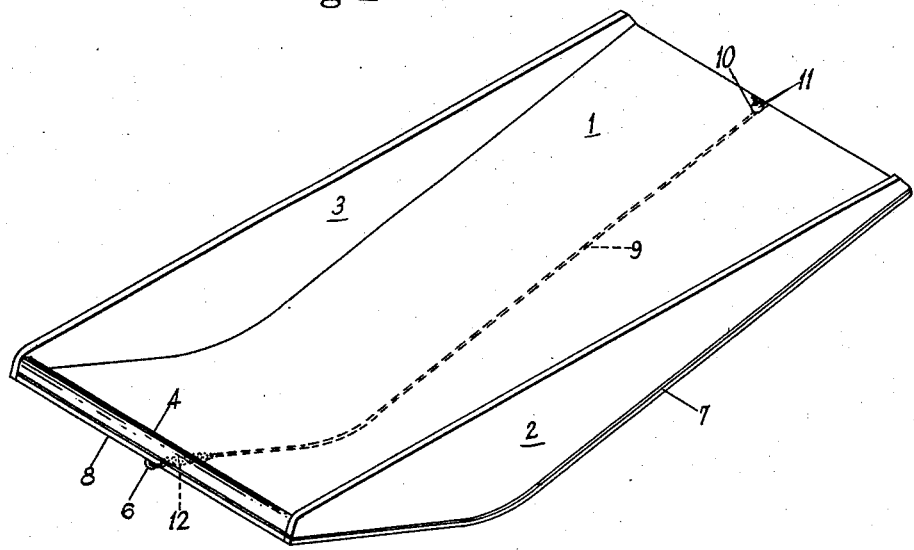
FIGURE 3 is an isometric view of the same structure.

The invention is based on the discovery that a great degree of stabilization will be added to the performance of a relatively flat bottomed vehicle as later described if a flexible strand-like member, attached at both ends, passes longitudinally beneath the bottom of the vehicle. The best results are obtained when a tensioning member such as a spring, is interposed between an end of the strand and the adjacent fastening means. The snow vehicle so equipped not only exhibits much less erratic behavior, but tends to be self-righting. For example, the vehicle of this invention when started in a course down a snow covered slope, will tend strongly to follow the line of greatest angularity of the slope to the horizontal, and if diverted by inequalities in the surface it will tend to resume the line of travel just mentioned. The reasons why this is so are not fully understood.

As will be seen from the several figures of the drawing, the snow-vehicle of this invention may consist of a panel-like body member 1 of a size and shape to receive the body of the user in an upright, sitting or prone position. The bottom member 1 is uni-planar throughout the greater portion of its length from the rear of the vehicle toward the front; but the front end of the panel-like body is preferably bent upwardly at a slight angle so that the front edge of the vehicle will normally lie above the surface of the snow-covering. Side members 2 and 3 are indicated for safety and convenience as well as (in certain constructions) to determine the curvature of the panel-like body member. At the front edge of the vehicle there is a bar 4 extending across between the ends of the side members and rigidly united therewith.

There are various ways in which the structure of this invention can be made. The use of metals is possible; and the structure can be made by assembling several metal parts or, particularly if light metal is used, it can be made as an integral casting. Similarly the structure may be produced by known techniques from moldable or deformable reinforced plastic materials such as glass cloth saturated with any of the well known thermo-setting resins, and laid up and cured in a mold. One excellent way of forming the structure is to use solid wood elements for the side members 2 and 3 and for the cross bar 4. The base panel 1 may in this instance, be a panel of relatively thin plywood, treated so as to be weather resistant. It will be held at its edges and front end to the edges of the side members 2 and 3 and the underside of the cross bar 4 as by screws 5 and 6. This will in itself produce the desired bowing of the front end of the base panel, eliminating the necessity for the pre-bending of the panel. If desired for strength, narrow bands 7 of metal may be positioned along the bottom edges of the panel, the screws 5 passing through the bands and having their heads countersunk therein. Similarly a narrow band 8 may underlie the front edge of the base panel and be fastened to the bar 4 by the holding screws.

In the practice of this invention a relatively light, flexible strand element 9 will underlie and be tensioned against the panel member 1. This flexible strand may be a piece of rope, or a small diameter metal cable, or of any other suitable construction. A satisfactory material is a conventional clothes line stock having a braided or twisted metallic core and a covering of plastic and being somewhat less than a quarter of an inch in diameter. This material has the advantages of substantial water- and weather-proof characteristics and is not permanently elongatable.

One end of the strand-like member 9 is detachably affixed to the rear edge of the base panel 1. An entirely satisfactory way of doing this is illustrated in the drawings where the strand member is provided with an end knot or other enlargement 10 and the rear edge of the base panel is notched as at 11. Other detachable fastening means are well within the skill of the worker.

In the exemplary embodiment the forward end of the strand-like member is attached to a coiled tension spring 12, which in turn is atached to a screw eye 6 which may be regarded as one of the means for fastening the base panel to the cross bar 4. The spring 12 might be eliminated if a weatherproof strand-like material were available having sufficient inherent resilient stretchability.

The position of the strand-like element in the figures is that which it assumes during the use of the vehicle unless and until it is deflected by inequalities in the surface over which the vehicle is traveling or by other forces. At the conclusion of a ride the strand may be detached from the rear edge of the vehicle and employed as a tow rope in pulling the vehicle back up the hill, or it can be used as a means for enabling the rider to sling the vehicle over his shoulder. An additional rope for towing purposes may, however, be provided without departing from the spirit of this invention.

Having thus described my invention, what I claim as new and desire to secure by Letters Patent is:

1. In a snow vehicle of the type having a bottom member providing an elongated broad bearing surface, stabilizing means comprising an elongated flexible member, said flexible member extending longitudinally of and substantially the length of said bearing surface; the ends of said member being affixed to said vehicle, the remainder of said member being free to flex transversely of said bearing surface, and means tending to urge said member to an unflexed linear position parallel to the long axis of said bearing surface.

2. The structure claimed in claim 1 wherein said flexible member comprises a strand-like element.

3. The structure claimed in claim 1 wherein said flexible member comprises a strand-like element, at least one end of which is affixed to a tension spring, said spring serving as said means tending to urge said flexible member to said unflexed linear position.

4. The structure claimed in claim 1 wherein said snow vehicle comprises elongated side members, said bottom member being elongated and having front and rear edges, said bottom member affixed to said side members and providing said bearing surface, said side members being so configured that the front portion of said bottom member curves upwardly to a position normally spaced above the surface of the snow.

5. The structure claimed in claim 4 wherein said flexible member comprises a strand-like element and a tension spring, one end of which is affixed to one end of said element, the free end of said spring being affixed to said snow vehicle at the front end of said bottom member, the free end of said strand-like element having an enlargement, the rear edge of said bottom member having a notch, the free end of said strand-like member being detachably held in said notch by said enlargement.

6. The structure claimed in claim 5 wherein said strand-like element comprises a plastic rope having substantial water- and weather-proof characteristics, and not permanently elongatable.

References Cited by the Examiner

UNITED STATES PATENTS 3,017,194  1/62  Anderson _____ 280—18

FOREIGN PATENTS 255,885  1/13  Germany.

ARTHUR L. LA POINT, *Primary Examiner.*